H. ETHERIDGE.
LINE SPACER FOR TYPE WRITERS.
APPLICATION FILED FEB. 16, 1915.
1,159,912.
Patented Nov. 9, 1915.
3 SHEETS—SHEET 1.
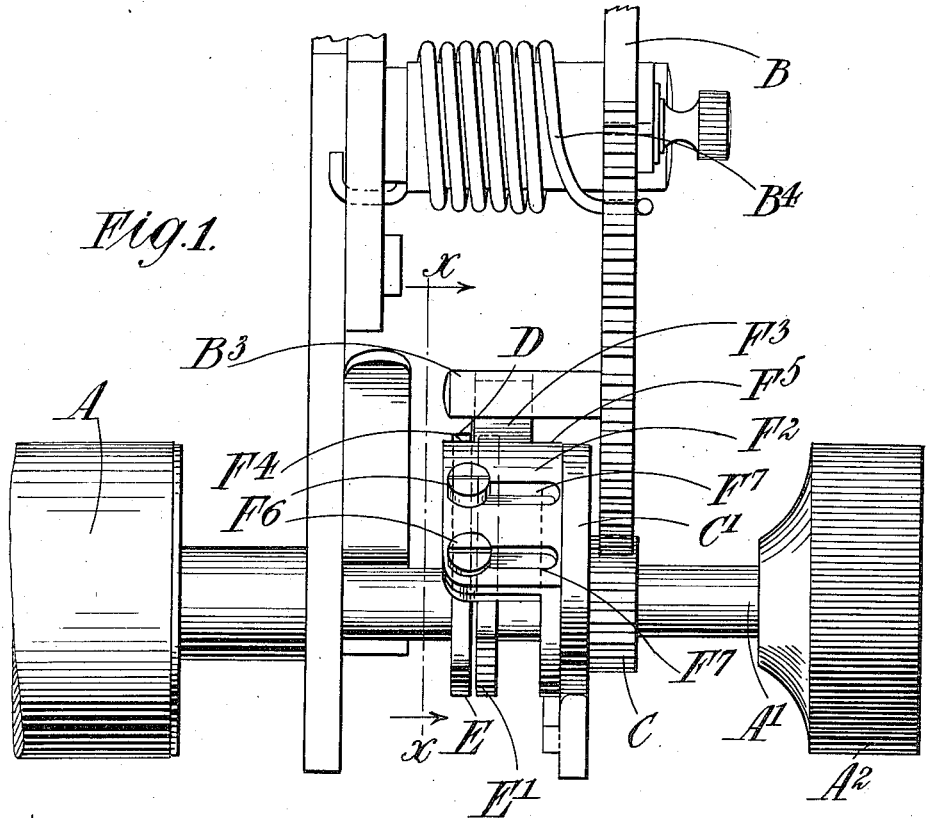
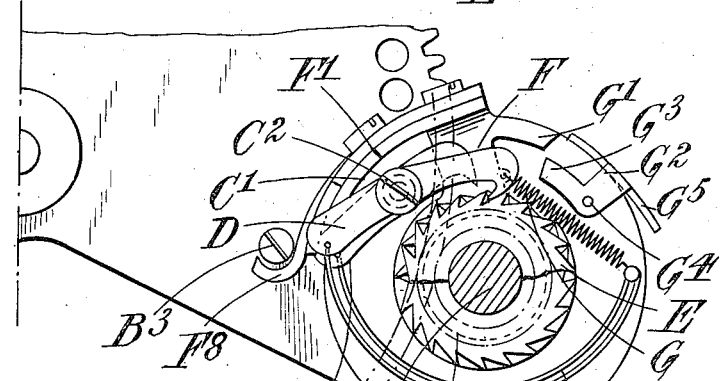
Witnesses.
Inventor

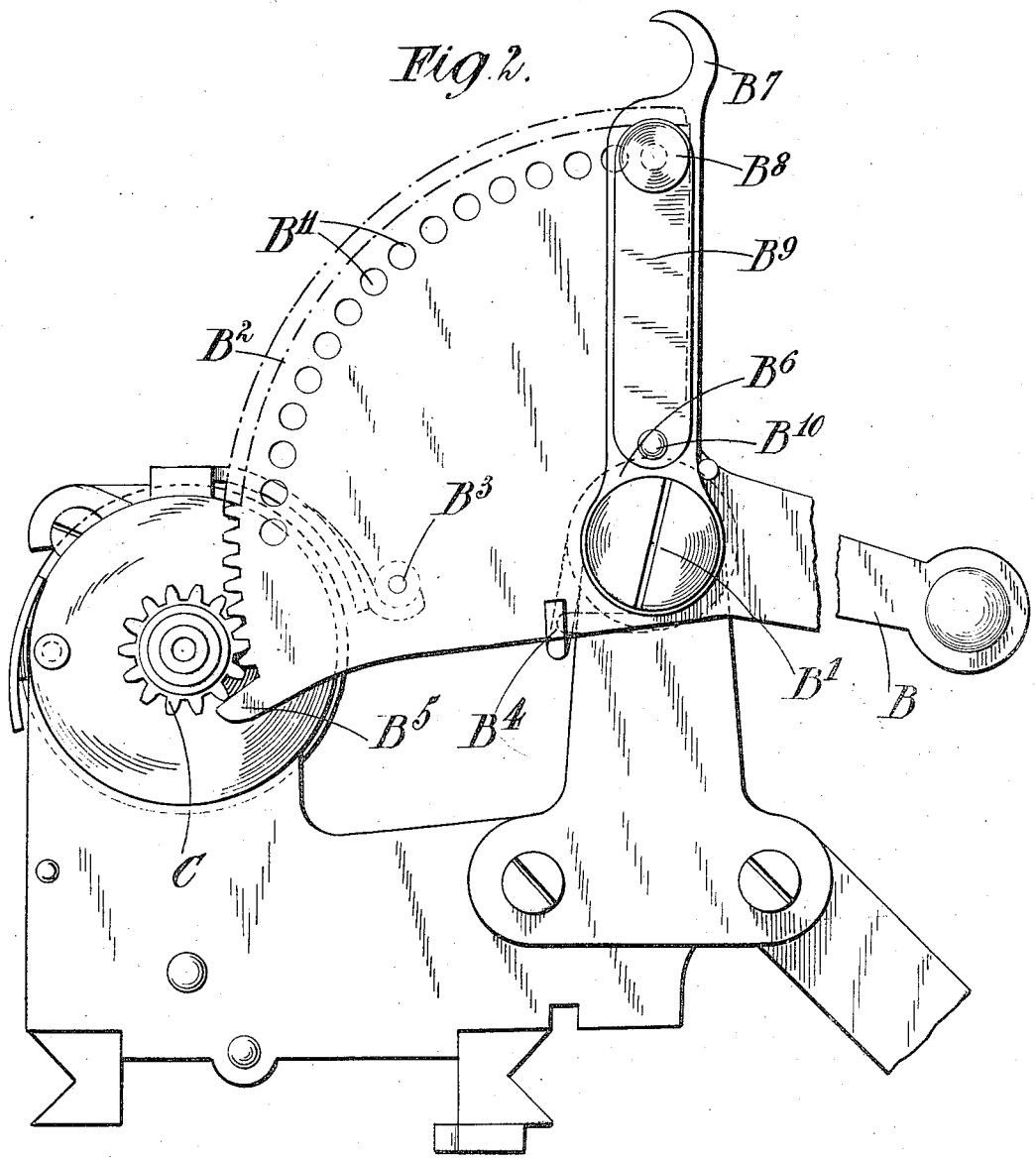

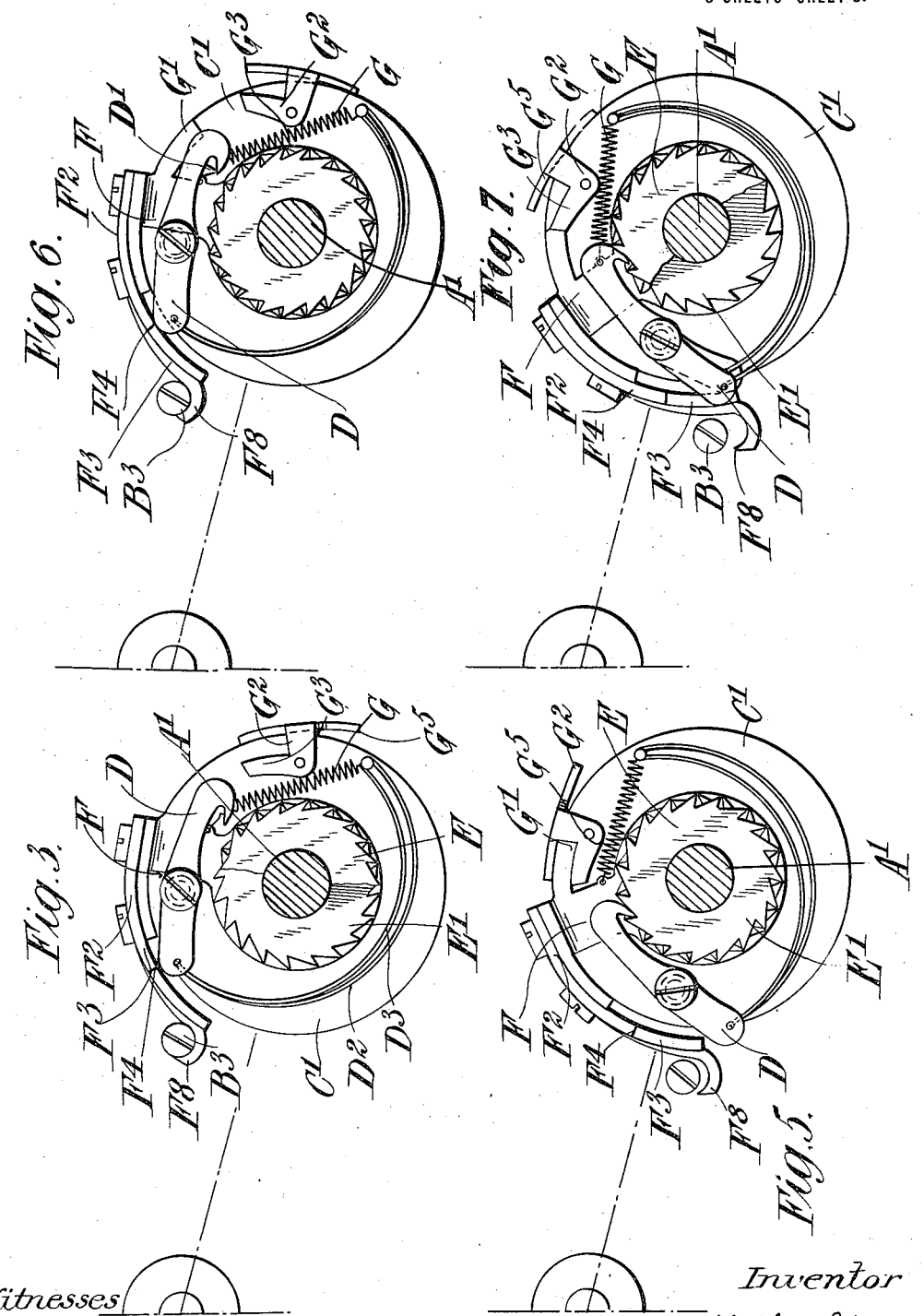

UNITED STATES PATENT OFFICE.

HERBERT ETHERIDGE, OF WIMBLEDON PARK, ENGLAND, ASSIGNOR TO THE BAR-LOCK TYPEWRITER COMPANY, LIMITED, OF LONDON, ENGLAND.

LINE-SPACER FOR TYPE-WRITERS.

1,159,912.  Specification of Letters Patent.  Patented Nov. 9, 1915.

Application filed February 16, 1915. Serial No. 8,540.

*To all whom it may concern:*

Be it known that I, HERBERT ETHERIDGE, a subject of the King of England, residing at Wimbledon Park, in Surrey, England, have invented certain new and useful Improvements in Line-Spacers for Type-Writers, of which the following is a specification.

This invention is for improvements in or relating to line-spacers for typewriters. The type of line-spacer to which the invention refers is that in which a lever or other operating handle is geared to the platen so that a given angular displacement of the operating member imparts a greater angular displacement to the platen. Such line-spacers have been heretofore arranged to rapidly throw the work out of the machine by the operation of the lever in one direction, but the return movement of the lever has been free.

According to the present invention, there is combined with the operating-member, a two-way clutch-mechanism and an automatic control-device therefor whereby the said member is operatively connected to the platen for driving in both directions when the member is out of the position of rest but is freed from the platen when the said member is in the position of rest.

Means may be provided if desired so that the clutch-mechanism may be at will rendered operative in one direction only. Again, means may be provided whereby the clutch-mechanism may be rendered operative in one direction for a greater angular displacement of the platen than in the other direction, and such means may also be so arranged if desired that the direction in which the greater angular displacement will take place may be controlled at the will of the operator.

More specifically the invention may be stated to comprise the employment with the driving-member (for example, a pinion and disk which pinion is geared with the segment of the operating-lever) rotated about the axis of rotation of the platen, of a two-way clutch-mechanism (for example two oppositely effective pawls and ratchets) operatively connecting the rotatable member of the platen (the pawls, for example, being carried on the disk and the ratchet-wheels fast on the platen-spindle), and a controlling-device (for example, a movable shield) which, by the movement of the driving-member and other parts to the position of rest, is brought into the path of the clutch-mechanism (for example the tails of the pawls) so as to move the same into disengaging position from the platen.

In the accompanying drawings which illustrate one method of carrying out this invention:—Figure 1 is a plan of the line-spacer mechanism; Fig. 2 is an end-elevation of the same as viewed from the right of Fig. 1; Fig. 3 is a section on the line $x$—$x$ of Fig. 1 with the parts in the position of rest; Fig. 4 is a section on the line $x$—$x$ of Fig. 1 showing the parts moved from the position of rest but with only the tail of one pawl so far disengaged; Fig. 5 shows the same parts further advanced so that the tails of both pawls are disengaged; Fig. 6 shows the same parts in the position of rest but with the adjustable stop set so as to prevent one pawl from coming into operation, and Fig. 7 shows the same parts advanced from the position of rest and with the adjustable stop in operation.

The same letters indicate the same parts throughout the drawings.

The platen A is provided with the usual spindle $A^1$ having on it a milled head $A^2$ whereby the platen may be turned for line-spacing in the ordinary way. The rapid line-spacer comprises a hand-lever B pivoted at $B^1$ to the frame of the machine and carrying a toothed sector $B^2$. The toothed sector meshes with a pinion C mounted free on the platen-spindle $A^1$ and fast with the pinion is a disk $C^1$.

Pivoted on a stud $C^2$ carried by the disk $C^1$ are two pawls D, $D^1$ respectively.

Fast on the platen-spindle are two ratchet-wheels E, $E^1$ respectively. The teeth of one wheel are made to face in the reverse direction to the teeth of the other and the pawls D, $D^1$ are made effective in opposite directions, thus the pawl D is shaped to engage the teeth of the wheel E and the pawl $D^1$ to engage the teeth of the wheel $E^1$. The tails of the two pawls, however, are brought out at the same end and lie side-by-side, the pawls being controlled by springs $D^2$, $D^3$ which always tend to thrust the tails outward and thus keep the operative ends of the pawls in engagement with the wheels E, $E^1$.

Mounted free on the platen-spindle $A^1$ is a radial arm F. This arm lies flat against the disk C¹ and can swing behind the pawls D, D¹. The upper end of the arm F is bent over to provide a plate F¹ whereon a pawl-shield F² is secured. The pawl-shield projects from the plate F¹ in the circumferential direction of the disk C¹ and such projecting portion is made to conform on its inner side to a circle struck from the center of the platen-spindle and lies vertically over the tails of the pawls D, D¹. This projecting portion is cut away on each side to provide a central tongue F³ with side steps F⁴, F⁵ respectively and the shield is secured to the plate F¹ by screws F⁶ which extend through slotted holes F⁷ in the shield. The slots are arranged to allow lateral movement of the shield, that is, movement in a direction parallel to the longitudinal axis of the platen-spindle.

Pivoted at G⁴ on the disk C¹ is a bell-crank shaped stop having arms G², G³ whereof one is radial to the disk and the other concentric with the same. The arm F and hence the shield F² is controlled by a spring G which always tends to swing the arm about the platen-spindle in such direction that a finger G' on the arm will be brought against the radial arm G³ of the stop G² G³. The stop is, however, provided with a finger-plate G⁵ and is made to move stiffly, or otherwise arranged so that it can be either left by the operator in the position shown in Fig. 4, or tilted into the position shown in Figs. 6 and 7 to bring the end of its arm G³ into the path of the finger G¹.

On the segment B¹ is a laterally projecting pin B³ and the shield F² has at the end of its projecting tongue an outwardly turned hook F⁸ which lies in the path of the pin B³.

The shield F² constitutes a controlling-device for the pawls D, D¹, its tongue and the stepped portions F⁴, F⁵ being placed sufficiently close in to the center of the platen-spindle to catch the tail-ends of the pawls and thus lift the operative ends out from engagement with the wheels E, E¹, and the spring G always tends to keep the shield F² or controlling-device in such position that the pawls are operative.

The operating-lever B is controlled by a spring B⁴ which always tends to bring the lever to the limit of its movement in one direction, that is, to bring a stop B⁵ at one end of the segment up against the toothed wheel C. To limit the movement in the other direction, a finger B⁶ is pivoted to the stud which carries the lever B and segment B², which finger has a hooked end B⁷ projecting beyond the segment. The finger also carries a detent-pin B⁸ secured at one end of a flat spring B⁹ which is fastened rigidly at its other end by a rivet B¹⁰ to the finger. The segment B² is provided with a series of orifices B¹¹ near its edge and the detent-pin B⁸, which is shown as engaging that orifice remote from the stop B⁵ on the segment, can be pulled out from the same and then the finger swung around and the detent allowed to engage any one of the other orifices B¹¹. The finger B⁶ with its hook B⁷ can thus be variously positioned on the segment B², and when the segment is moved counter-clockwise, (Fig. 2), the finger strikes the platen-spindle and thus limits the movement in the direction contrary to that controlled by the spring B⁴.

The operation of the line-spacing mechanism is as follows:—In typing bill-slips it is often desired to make duplicates one below the other on a single record sheet, the slips themselves being, however, each separate. In such cases, the rapid line-spacer is required to rotate the platen until the slip and record sheet are run out far enough to discharge the slip but not the record-sheet, and then the mechanism is required to feed in another slip by the return movement, but the record of the second slip must not commence on the last line of the record already made, but a space, say equal to a line-space shall be left between the one record and the next. It is to allow for this spacing that the steps F⁴, F⁵ on the shield F² are provided. When the parts are at rest, the operating-handle is kept in the position shown in Fig. 2 by its spring B⁴ and the pawls D, D¹ then lie with their tail-ends beneath the shield F², as shown in Fig. 3, so that their operative ends are disengaged from the toothed wheels E, E¹. The shield in this position is being pulled upon by its spring G, but cannot be moved by the spring toward the stop G², G³ because the hooked end F⁸ of the shield is held by the pin B³ on the segment B². The shield F² for the present case will be assumed to be secured on the arm F in the position shown in Fig. 1, so that the step F⁴ lies over the pawl D. With the parts so disposed it follows that if the operator having finished a slip and wanting to discharge it and feed another one in, moves the lever B in a counter-clockwise direction as viewed in Fig. 2 against the action of the spring B⁴, the pinion C will be rotated clockwise. This wheel, however, being free on the platen-spindle does not immediately rotate the latter, but it carries around with it the disk C¹ to which the wheel is fast. The disk thus advances the pawls D, D¹ in a counter-clockwise direction as viewed in Fig. 3, so that they begin to move from underneath the shield F² which cannot operatively follow them because the spring G keeps its hooked end F⁸ up against the pin B³ in the segment B², and although this pin at the beginning of the movement of the segment is moving in a direction to advance the shield along with the pawls, the pawls travel much faster than the shield owing to the ratio of the gearing between the segment and the pinion C. As the pawls are advanced, the pawl D first comes out from under the step F⁴ and drops into engagement with the wheel E. This immediately engages the platen operatively with the operating-lever B so that now the platen begins to rotate with the pinion C and disk C¹ in a direction to discharge the bill-slip from the machine. In Fig. 4, the pawl D is shown as released, but the pawl D¹ has not yet passed from under the end of the tongue F³ on the shield. In Fig. 5 the operating lever has been moved further and both pawls are now free of the shield so that the platen is virtually locked to the pinion C and disk C¹ and can be moved positively in both directions by the operating-lever. It will be noted that when both pawls have got free of the shield, the finger G¹ of the arm F which carries the shield butts against the arm G² of the stop G² G³ (Fig. 5) and further movement of the operating-lever thus causes the shield to be carried around bodily with the disk C¹, the hook F⁸ being carried forward out from engagement with the pin B³ on the segment B². The platen is thus free to make one or more revolutions according to the setting of the stop B⁷, the advance being checked when the stop comes against the platen-spindle. This stop B⁷ is of course set by the operator to allow greater or less movement according to the length of the slips he is dealing with. Having brought the lever to the limit of the movement in the discharging direction, the operator now puts another slip against the platen ready for feeding in and returns the lever B in the direction in which the spring B⁴ tends to move it. The lever is thus brought to drive the platen and its associated parts, its main function being to retain the lever at its position of rest. On the return movement, the pawl D¹ is the operative pawl and carries the platen back, drawing the slip and record-sheet in, until the tail of the pawl strikes the end of the tongue F³ of the shield F²; the pawl is then released and thus the movement of the platen ceases although the pinion C and disk C¹ still rotate, carrying the pawls with them until the pawl D also is lifted out from engagement with its wheel E by its tail striking the step F⁴ of the shield F².

From the above description it will be seen that the platen is rotated through a greater angle in the direction to discharge the bill-slip than it is to draw the next bill-slip in because the pawl D which is operative to discharge the bill-slip comes into action almost immediately the operating-lever begins to move, whereas the pawl D¹ which is operative to draw the next bill-slip in is taken out of action before the platen is brought back to the same point as that at which it was when the pawl D came into action. It is only necessary therefore to make the angular distance between the step F⁴ and the end of the tongue F³ of the shield, equal to the angular distance or line-spacing which is required between the bottom of the record of one bill-slip and the top of the record of the next, in order that the one bill-slip may be discharged and the next brought into proper position for writing without any after adjustment.

It will be appreciated that if the step B⁴ were not provided, the operator after having got the new bill-slip into position would have to rotate the platen by hand one or more line-spaces to bring about the requisite spacing between the two records.

The object of bringing both pawls out from engagement with the ratchet-wheels E, E¹ when the lever is in the position of rest is, of course, to leave the platen free for adjustment by the operator without using the rapid line-spacer mechanism, as for instance in working from line to line as he fills up the one slip.

In some cases it may be desired to make the greater movement of the platen take place on the return movement of the lever B. For this purpose the step F⁵ is provided and to bring that step into operation, the screws F⁶ securing the shield F² are released and the shield is moved laterally to bring the step F⁵ over the pawl D¹ and the tongue F³ over the pawl D. It results then that the pawl D¹ will be released before the pawl D, and therefore will be put out of action after the pawl D, hence the platen will be rotated by the return movement of the lever B through a greater angular distance than it will be rotated by the advance movement of the lever B. The double step arrangement allows the same mechanism to be applied to machines which are fed from the back or front of the platen.

In some cases it is desired to give equal movements of the platen backward and forward, as for instance when addressing envelops. This can be done by moving the shield into the central position so that the tongue F³ which is wide enough to cover both pawls, lies over the two pawls and thus brings them into and out of engagement together. Again, where it is desired that the mechanism shall be operative in one direction only, the stop G² G³ is moved from the position shown in Figs. 3—4 to that shown in Fig. 6, and the shield F² is placed in position for one or other of its steps F⁴, F⁵ to coöperate with one or other of the pawls according to which direction it is desired the mechanism shall be operative in. It will be seen that when the stop G² G³ is moved over to the position shown in Fig. 6, its arm G³ lies in the path of the finger G¹ on the shield-carrying arm F and the parts are so proportioned that when the mechanism has been advanced a sufficient distance to free, say, the pawl D (if the step F⁴ is being utilized of the shield F²) from the shield, the arm G³ of the stop is brought against the finger G¹ of the shield-carrying arm F before the second pawl D¹ can get from beneath the end of the tongue F³ of the shield. This position of the parts is shown in Fig. 7, and it will be seen that once the stop G³ has thus reached the arm F, the arm and shield will begin to move as one with the disk C¹, so that whatever degree of movement is given to the platen through the pawl D which is in operation, no freeing of the pawl D¹ will take place, and hence when the operating-lever B is released, the pawl D will merely trail back over the wheel E without moving the platen. The operating-lever is thus made to perform an operative stroke in one direction and an idle stroke in the other, and the operative stroke may be either a feeding-in stroke or feeding-out stroke according to which step of the shield F² is employed, and according to whether the machine with which the line-spacer is used is of a type in which the feed takes place in front or behind the platen.

What I claim as my invention and desire to secure by Letters Patent is:—

1. In a "rapid line-spacer" for a typewriter the combination of, an operating-member, a platen, a two-way clutch-mechanism operatively connecting these two elements, a controlling-device operatively connected to the operating-member and clutch-mechanism in such manner as to throw the clutch-mechanism "out" when the operating-member is in the position of rest and "in" when the operating-member is displaced from the position of rest, and means whereby the clutch-mechanism may at will be set prior to moving the operating member to be operative in one direction only, substantially as set forth.

2. In a "rapid line-spacer" for a typewriter the combination of, an operating-member, a platen, a two-way clutch-mechanism operatively connecting these two elements, a controlling device operatively connected to the operating-member and clutch-mechanism in such manner as to throw the clutch-mechanism "out" when the operating-member is in the position of rest and "in" when the operating-member is displaced from the position of rest, and means whereby the clutch-mechanism may be set prior to moving the operating member to render it operative through a greater angular displacement in one direction than in the other, substantially as set forth.

3. In a "rapid line-spacer" for a typewriter the combination of, an operating-member, a platen, a two-way clutch-mechanism operatively connecting these two elements, a controlling-device operatively connected to the operating-member and clutch-mechanism in such manner as to throw the clutch-mechanism "out" when the operating-member is in the position of rest and "in" when the operating-member is displaced from the position of rest, means whereby the clutch-mechanism may be set to render it operative through a greater angular displacement in one direction than in the other, and means whereby the direction in which the greater angular displacement will take place may be controlled at the will of the operator, substantially as set forth.

4. In a "rapid line-spacer" for a typewriter the combination of an operating member, a platen, a driving member therefor rotatably mounted concentrically with the platen and driven from the operating member, the driving means being such that the operating member may rotate the platen through more than one revolution, a two-way clutch mechanism for operatively connecting the driving member and the platen which clutch mechanism has a part for rendering the clutch operative, which part is carried around in a circle with the clutch mechanism when this is operative and may be carried around for more than one revolution, and a controlling device for the said part which is operatively connected relatively to the operating member in such way that during the initial movement of the operating member the controlling device is moved out of the path of the said clutch part and cannot return thereto until the operating member is returned, even though the said clutch part may be brought to the same angular position as that in which it is engaged by the controlling element prior to the return of the operating member, substantially as set forth.

5. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member, two ratchet-wheels therefor operatively engaged with the platen, and a cam-shield so positioned that when the parts come to the position of rest the pawls are engaged thereby and their operative ends lifted out from engagement with the ratchet-wheels, substantially as set forth.

6. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member, two ratchet-wheels therefor operatively engaged with the platen, and a cam-shield so positioned that when the parts come to the position of rest the pawls are engaged thereby and their operative ends lifted out from engagement with the ratchet-wheels, the said cam-shield having its operative face for one pawl so positioned relatively to the other pawl and its operative face on the cam-shield that one pawl will be dropped "in" to operate the platen before the other on the movement of the mechanism from the position of rest and the pawl last "in" will be the first "out" on the return movement, substantially as set forth.

7. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member, two ratchet-wheels therefor operatively engaged with the platen, a cam-shield so positioned that when the parts come to the position of rest the pawls are engaged thereby and their operative ends lifted out from engagement with the ratchet-wheels, the said cam-shield having its operative face for one pawl so positioned relatively to the other pawl and its operative face on the cam-shield that one pawl will be dropped "in" to operate the platen before the other on the movement of the mechanism from the position of rest and the pawl last "in" will be the first "out" on the return movement, and means for adjusting the said relative positions of the operating faces of the cam-shield and their pawls so that simultaneous operation of the pawls may be effected, substantially as set forth.

8. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member, two ratchet-wheels therefor operatively engaged with the platen, a cam-shield so positioned that when the parts come to the position of rest the pawls are engaged thereby and their operative ends lifted out from engagement with the ratchet-wheels, the said cam-shield having its operative face for one pawl so positioned relatively to the other pawl and its operative face on the cam-shield that one pawl will be dropped "in" to operate the platen before the other on the movement of the mechanism from the position of rest and the pawl last "in" will be the first "out" on the return movement, and means for adjusting the said relative positions of the operating faces on the cam-shield and the pawls so that the pawl which was made to drop "in" second and was lifted "out" first will be made to drop "in" first and be taken "out" second, substantially as set forth.

9. In a "rapid line-spacer" for a typewriter the combination of, an operating-member, a platen, a driven-member therefor rotatably mounted concentrically with the platen and driven from the operating-member, two yieldingly-controlled and oppositely working pawls pivoted on the driving-member in planes which are side-by-side and perpendicular to the axis of rotation of the platen, two ratchet-wheels side-by-side therefor concentric and operatively engaged with the platen, a cam-shield so positioned that when the parts come to the position of rest the pawls are engaged thereby and their operative ends lifted out from engagement with the ratchet-wheels, the said cam-shield having its operative face for one pawl stepped back relatively to the operative face for the other pawl so that one pawl will be dropped "in" to operate the platen before the other on the movement of the mechanism from the position of rest and the pawl last "in" will be the first "out" on the return movement, substantially as set forth.

10. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member in planes which are side-by-side and perpendicular to the axis of rotation of the platen, two ratchet-wheels side-by-side therefor concentric and operatively engaged with the platen, a cam-shield so positioned that when the parts come to the position of rest the pawls are engaged thereby and their operative ends lifted out from engagement with the ratchet-wheels, the said cam-shield having its operative face for one pawl stepped back relatively to the operative face for the other pawl so that one pawl will be dropped "in" to operate the platen before the other on the movement of the mechanism from the position of rest and the pawl last "in" will be the first "out" on the return movement, and means for adjusting the cam-shield across the pawls so that the one operative face may control both pawls simultaneously, substantially as set forth.

11. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member in planes which are side-by-side and perpendicular to the axis of rotation of the platen, two ratchet-wheels side-by-side therefor concentric and operatively engaged with the platen, a cam-shield so positioned that when the parts come to the position of rest the pawls are engaged thereby and their operative ends lifted out from engagement with the ratchet-wheels, the cam-shield having a forward operative face for one pawl and an operative face for the other pawl stepped back relatively to the first so that one pawl will come into and out of operation before the other, the said cam-shield moreover having a third cam-face also stepped back relatively to the forward face, and means for adjusting the cam-shield laterally across the pawls so that one or other of the set-back cam-faces may be brought into operative position for one or other of the pawls for the purpose described, substantially as set forth.

12. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member in planes which are side-by-side and perpendicular to the axis of rotation of the platen, two ratchet-wheels side-by-side therefor concentric and operatively engaged with the platen, a cam-shield so positioned that when the parts come to the position of rest the pawls are engaged thereby and their operative ends lifted out from engagement with the ratchet-wheels, the said cam-shield having a forward operative face which is wide enough to engage both pawls simultaneously and to simultaneously lift them out from engagement or drop them into engagement and also two operative faces one on each side of and set back relatively to the forward cam-face, and means for adjusting the cam-shield laterally across the pawls so that either pawl may engage the forward cam-face and the other one of the stepped-back cam-faces according to selection, or both pawls may engage the forward cam-face, substantially as set forth.

13. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted to the driving-member, two ratchet-wheels therefor operatively engaged with the platen, a cam-shield mounted to move about the axis of rotation of the platen and so spaced from the said axis so as to engage and lift the pawls out of action when brought to a given angular position relatively to the same, the cam-shield having a forward cam-face over one pawl and a cam-face for the other pawl stepped back relatively to the first so that greater relative movements of the pawls and cam-shield would be required to release the pawl under the forward cam-face than under the stepped-back face, yielding-control for the cam-shield which tends to keep it in an angular position free of the pawls, a stop carried by a movable part of the mechanism and brought into position to hold the cam-shield against the action of its controlling-spring as the parts come to rest but which stop is carried away by its part free of the cam-shield during operation of the mechanism, and an adjustable-stop on the driving member which can be set to prevent the cam-shield from moving under the action of its spring more than is sufficient to release the pawl under the stepped-back cam-face, substantially as set forth.

14. In a "rapid line-spacer" for a typewriter the combination of, an operating-member, a platen, a driving-member therefor rotatably mounted concentrically with the platen and driven from the operating-member, two yieldingly-controlled and oppositely working pawls pivoted on the driving-member, two ratchet-wheels therefor operatively engaged with the platen, a cam-shield carried around with the driving-member and yieldingly-controlled in the circumferential direction of the driving-member to keep it against a stop where it is clear of the pawls, and an abutment carried by a movable part of the mechanism which as the parts come to the position of rest engages the cam-shield and holds it against the action of its yielding-control to carry it around circumferentially with the driving-member so that it is brought into contact with the pawls as these continue to be carried around with the driving-member and lifts them out of engagement with their ratchets, substantially as set forth.

In testimony whereof I have signed my name to this specification in the presence of two subscribing witnesses.

HERBERT ETHERIDGE.

Witnesses:
H. D. JAMESON,
A. NUTTING.